US012659174B2

(12) United States Patent
Holst et al.

(10) Patent No.: US 12,659,174 B2
(45) Date of Patent: Jun. 16, 2026

(54) TRACKING NETWORK DEVICES IN A CIRCULAR ECONOMY WITH GREEN PASSPORTS

(71) Applicant: Cisco Technology, Inc., San Jose, CA (US)

(72) Inventors: Amanda L. Holst, Campbell, CA (US); Ana Montenegro, Benito Juarez (MX); M. David Hanes, Lewisville, NC (US); Ishita Maheshkumar Thanki, San Jose, CA (US); Sudha Katgeri, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 330 days.

(21) Appl. No.: 18/349,718

(22) Filed: Jul. 10, 2023

(65) Prior Publication Data

US 2025/0021942 A1     Jan. 16, 2025

(51) Int. Cl.
| | |
|---|---|
| *H04L 9/32* | (2006.01) |
| *G06Q 10/30* | (2023.01) |
| *H04L 41/0803* | (2022.01) |
| *H04L 67/00* | (2022.01) |
| *H04L 67/125* | (2022.01) |
| *H04W 12/08* | (2021.01) |

(52) U.S. Cl.
CPC ........... *H04L 9/3268* (2013.01); *G06Q 10/30* (2013.01); *H04L 41/0803* (2013.01); *H04L 67/125* (2013.01); *H04L 67/34* (2013.01); *H04W 12/08* (2013.01)

(58) Field of Classification Search
CPC ... G06Q 10/30; H04L 9/3268; H04L 41/0803; H04L 67/125; H04L 67/34; H04W 12/08
See application file for complete search history.

(56) References Cited

U.S. PATENT DOCUMENTS

| | | | |
|---|---|---|---|
| 2018/0048719 A1* | 2/2018 | Eyer ...................... | H04L 67/146 |
| 2018/0247280 A1* | 8/2018 | Bowles .................... | G07F 7/06 |
| 2021/0288962 A1 | 9/2021 | Lear et al. | |
| 2022/0091081 A1* | 3/2022 | Ivanov .................... | G06N 5/04 |
| 2022/0360562 A1 | 11/2022 | Hanes et al. | |
| 2022/0417039 A1* | 12/2022 | Pan ...................... | G06F 16/9558 |

(Continued)

*Primary Examiner* — Cheng-Feng Huang
(74) *Attorney, Agent, or Firm* — Rutan & Tucker, LLP; Ravi Mohan; Marc McClain

(57) ABSTRACT

Devices and methods are discussed herein to track networked electronic devices during the course of their lifecycles. Each electronic device may be provided with a "green passport" by its manufacturer which contains all relevant information concerning the operation of the device during its lifetime. When a new electronic device is coupled to a network, it may emit a uniform resource identifier (URI) which may be received by a server that may operate as a manager for the green passports of devices within its purview. The manager may download the green passport from the manufacturer's server. The manager may verify the authenticity of the URI and/or the green passport to avoid security threats. The manager may monitor the electronic device and issue notifications throughout its lifecycle. At the end-of-life of the electronic device, the manager may issue sustainable disposable information for the device.

17 Claims, 9 Drawing Sheets

(56)　　　　　References Cited

U.S. PATENT DOCUMENTS

| | | | |
|---|---|---|---|
| 2023/0086759 A1 | 3/2023 | Vanderveen et al. | |
| 2023/0124811 A1 | 4/2023 | Jiménez | |
| 2023/0161303 A1* | 5/2023 | Xia ........................ | G05B 15/02 |
| | | | 700/28 |
| 2025/0061416 A1* | 2/2025 | Schwabe ............. | H01M 10/425 |
| 2025/0190954 A1* | 6/2025 | Tollerfield ............. | G06Q 10/30 |
| 2025/0193071 A1* | 6/2025 | Jiménez ............. | H04L 41/0896 |

* cited by examiner

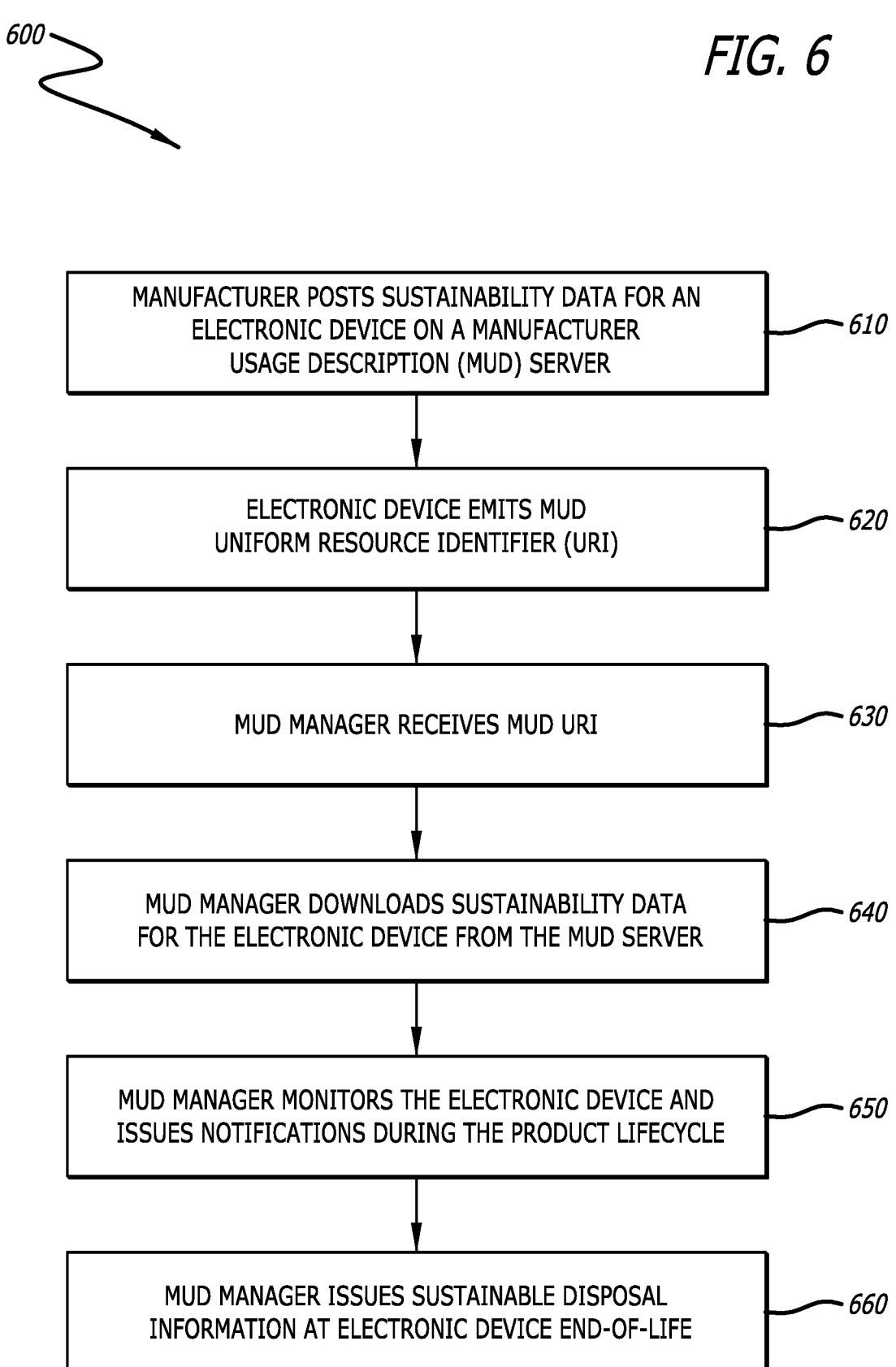

MANUFACTURER POSTS SUSTAINABILITY DATA FOR AN ELECTRONIC DEVICE ON A MANUFACTURER USAGE DESCRIPTION (MUD) SERVER — 610

ELECTRONIC DEVICE EMITS MUD UNIFORM RESOURCE IDENTIFIER (URI) — 620

MUD MANAGER RECEIVES MUD URI — 630

MUD MANAGER DOWNLOADS SUSTAINABILITY DATA FOR THE ELECTRONIC DEVICE FROM THE MUD SERVER — 640

MUD MANAGER MONITORS THE ELECTRONIC DEVICE AND ISSUES NOTIFICATIONS DURING THE PRODUCT LIFECYCLE — 650

MUD MANAGER ISSUES SUSTAINABLE DISPOSAL INFORMATION AT ELECTRONIC DEVICE END-OF-LIFE — 660

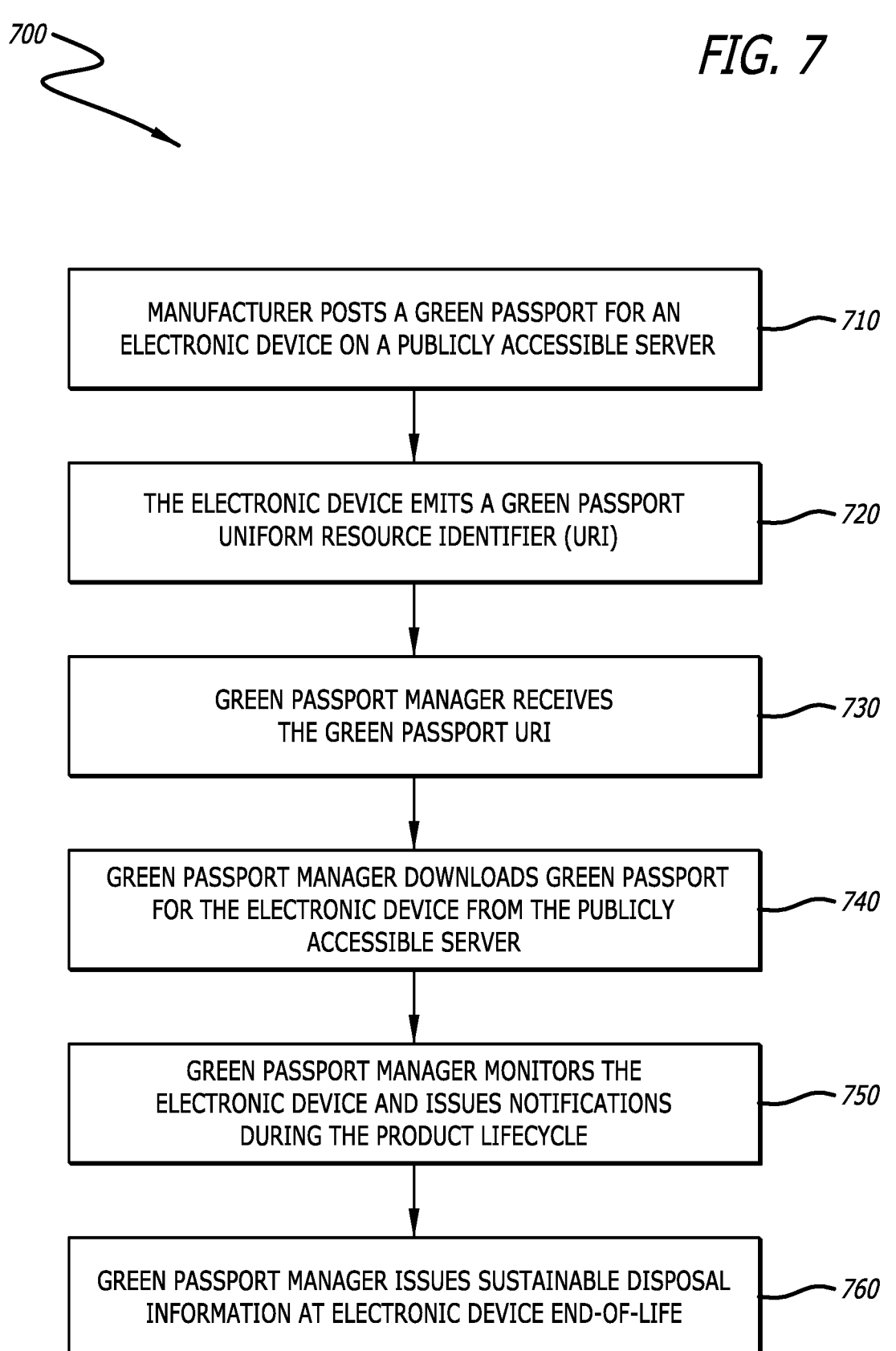

MANUFACTURER POSTS A GREEN PASSPORT FOR AN ELECTRONIC DEVICE ON A PUBLICLY ACCESSIBLE SERVER — 710

THE ELECTRONIC DEVICE EMITS A GREEN PASSPORT UNIFORM RESOURCE IDENTIFIER (URI) — 720

GREEN PASSPORT MANAGER RECEIVES THE GREEN PASSPORT URI — 730

GREEN PASSPORT MANAGER DOWNLOADS GREEN PASSPORT FOR THE ELECTRONIC DEVICE FROM THE PUBLICLY ACCESSIBLE SERVER — 740

GREEN PASSPORT MANAGER MONITORS THE ELECTRONIC DEVICE AND ISSUES NOTIFICATIONS DURING THE PRODUCT LIFECYCLE — 750

GREEN PASSPORT MANAGER ISSUES SUSTAINABLE DISPOSAL INFORMATION AT ELECTRONIC DEVICE END-OF-LIFE — 760

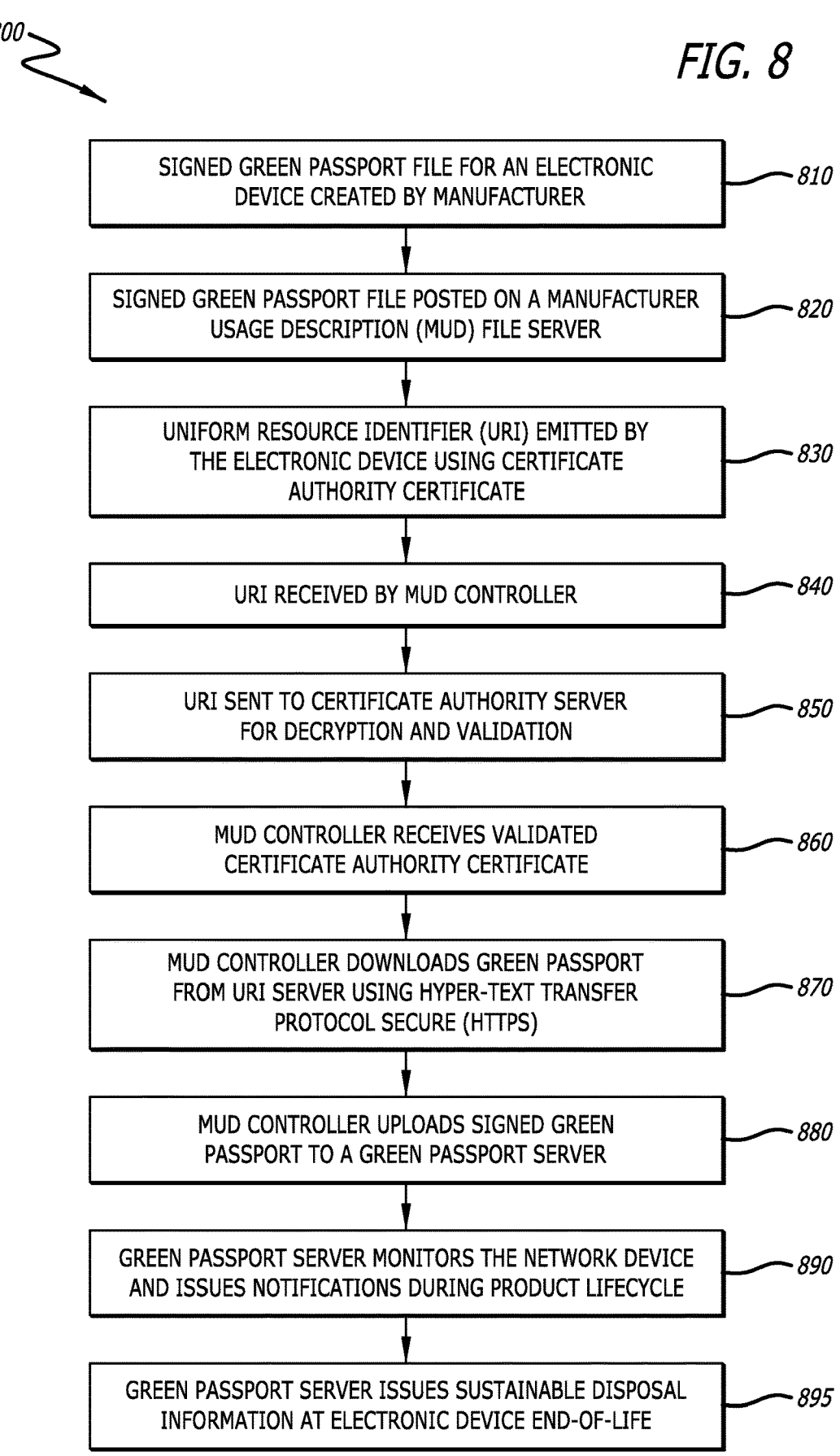

SIGNED GREEN PASSPORT FILE FOR AN ELECTRONIC DEVICE CREATED BY MANUFACTURER — 810

SIGNED GREEN PASSPORT FILE POSTED ON A MANUFACTURER USAGE DESCRIPTION (MUD) FILE SERVER — 820

UNIFORM RESOURCE IDENTIFIER (URI) EMITTED BY THE ELECTRONIC DEVICE USING CERTIFICATE AUTHORITY CERTIFICATE — 830

URI RECEIVED BY MUD CONTROLLER — 840

URI SENT TO CERTIFICATE AUTHORITY SERVER FOR DECRYPTION AND VALIDATION — 850

MUD CONTROLLER RECEIVES VALIDATED CERTIFICATE AUTHORITY CERTIFICATE — 860

MUD CONTROLLER DOWNLOADS GREEN PASSPORT FROM URI SERVER USING HYPER-TEXT TRANSFER PROTOCOL SECURE (HTTPS) — 870

MUD CONTROLLER UPLOADS SIGNED GREEN PASSPORT TO A GREEN PASSPORT SERVER — 880

GREEN PASSPORT SERVER MONITORS THE NETWORK DEVICE AND ISSUES NOTIFICATIONS DURING PRODUCT LIFECYCLE — 890

GREEN PASSPORT SERVER ISSUES SUSTAINABLE DISPOSAL INFORMATION AT ELECTRONIC DEVICE END-OF-LIFE — 895

TRACKING NETWORK DEVICES IN A CIRCULAR ECONOMY WITH GREEN PASSPORTS

The present disclosure relates to network devices. More particularly, the present disclosure relates to tracking network devices for sustainability throughout their lifecycle.

BACKGROUND

Environmental sustainability is becoming more of a requirement in many places and applications. Current methods of tracking network devices do not consider sustainability. In particular, they do not consider the disposal of network devices at the end of their lifecycle.

This is important because proper disposal of the materials comprising an electronic device creates less electronic waste (e-waste) and ensures a maximal amount of recycling of the materials into new products. The idea of a "circular economy" includes planning the entire lifecycle of a product for sustainability upfront. This includes the choice of materials in the design (both the product and its packaging) with an eye to proper disposal/recycling at end-of-life.

SUMMARY

Systems and methods for tracking network devices for sustainability throughout their lifecycle in accordance with embodiments of the disclosure are described herein. In some embodiments, a networking device, includes a processor, a memory, a network interface configured to be coupled to a network, and a sustainability management logic. The sustainability management logic is configured to receive a Uniform Resource Identifier (URI) from an electronic device, and the sustainability management logic is configured to download a green passport corresponding to the electronic device from a file server.

In some embodiments, the URI is encrypted; the sustainability management logic is configured to send the encrypted URI to a Certificate Authority (CA) server for decryption and validation, and the sustainability management logic is configured to receive the decrypted and validated URI from the CA server.

In some embodiments, the sustainability management logic is configured to monitor the electronic device, and the sustainability management logic is configured to issue notifications during a lifecycle of the electronic device based on the green passport.

In some embodiments, the sustainability management logic is configured to upload the green passport corresponding to the decrypted and validated URI to a green passport server.

In some embodiments, the networking device is a Manufacturer Usage Description (MUD) controller; and the file server is a MUD server.

In some embodiments, the URI received from the electronic device is encrypted using a certificate authority certificate.

In some embodiments, the URI received from the electronic device is encrypted using an X.509 extension.

In some embodiments, the green passport posted on the MUD server is signed and posted by a manufacturer of the electronic device.

In some embodiments, the networking device downloads the green passport from the file server using Hyper-Text Transfer Protocol Secure (HTTPS).

In some embodiments, the green passport corresponding to the decrypted and validated URI is uploaded to a green passport server.

In some embodiments, the green passport includes sustainability data for the electronic device.

In some embodiments, the green passport includes end-of-life disposal information for the electronic device.

In some embodiments, a method of operating a Green Passport (GP) manager, includes monitoring a GP server for green passports, receiving a Uniform Resource Identifier (URI) from an electronic device, receiving a green passport for the electronic device from the GP server, monitoring the electronic device, and issuing notifications during a lifecycle of the electronic device.

In some embodiments, the green passport includes sustainability data for the electronic device.

In some embodiments, the green passport is stored in JSON format.

In some embodiments, a manufacturer of the electronic device populates the green passport of the electronic device on the GP server.

In some embodiments, the green passport includes end-of-life disposal information for the electronic device.

In some embodiments, a non-transitory computer-readable storage media configured to store instructions and data to be executed by one or more processors, where the instructions, when executed, cause a Manufacturer Usage Description (MUD) manager to perform steps as follows, includes monitoring a MUD server for sustainability data, receiving a MUD Uniform Resource Identifier (URI) from an electronic device, downloading green passport data for the electronic device from the MUD server in response to the URI, monitoring the electronic device, and issuing notifications during a lifecycle of the electronic device.

In some embodiments, the green passport data stores end-of-life disposal information for the electronic device.

In some embodiments, the green passport data is stored in JSON format.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 6 is a flowchart depicting a process for tracking an electronic device in accordance with various embodiments of the disclosure;

FIG. 7 is a flowchart depicting a process for tracking an electronic device in accordance with various embodiments of the disclosure;

FIG. 8 is a flowchart depicting a process for tracking an electronic device in accordance with various embodiments of the disclosure.

Figure 1:
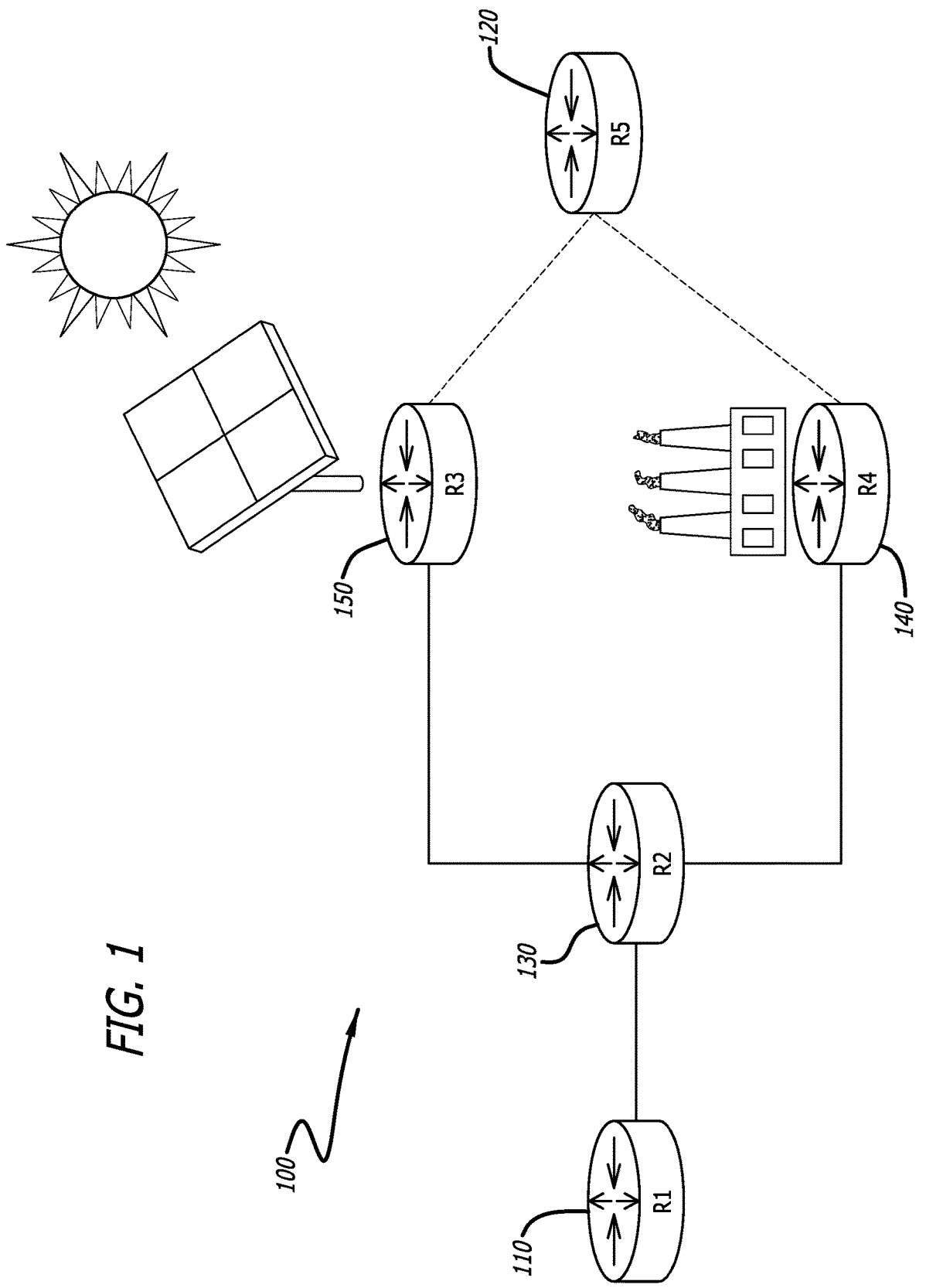
FIG. 1 is a schematic diagram of a network with network devices powered by various power source types in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein to track networked electronic devices during the course of their lifecycles. Each electronic device may be provided with a "green passport" by its manufacturer, which contains all relevant information concerning the operation of the device during its lifetime and proper disposal methods at end-of-life. When a new electronic device is coupled to a network, it may emit a Uniform Resource Identifier (URI).

The URI may be received by a server that may operate as a manager and/or controller for the green passports of devices within its purview. The manager/controller may download the green passport from the manufacturer's server or from a publicly accessible server. The manager/controller may verify the authenticity of the URI and/or the green passport to avoid security threats like a spoofed device or a man-in-the-middle attack.

The manager/controller may monitor the electronic device throughout its lifecycle. It may issue notifications during the lifecycle. At the end-of-life of the electronic device, the manager/controller may issue sustainable disposable information for the device.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like), or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations, which, when joined logically together, comprise the function and achieve the stated purpose for the function.

Indeed, a function of executable code may include a single instruction or many instructions and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but is not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as a field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive and/or mutually inclusive unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic diagram of a network 100 with network devices powered by various power source types in accordance with an embodiment of the disclosure is shown. The network 100 can include a plurality of devices, e.g., routers 110, 130, 140, and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and may be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impact-heavy power source such as a coal-powered power plant. However, modern power grids often have more diverse and cleaner energy sources for the provided generated energy. Some devices can still be powered by power sources that utilize fossil fuels, such as the router R4 140, as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity but may have negative environmental impacts, such as carbon emission generation, associated with the production and/or disposal of the solar array. Various methods of measuring these negative environmental impacts may occur. One measurement may be to examine the waste products created by the power generated (such as nuclear waste vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measures the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided by each device along the route of data travel. Additionally, other factors, such as the attributes unique to each device, can be factored in, along with the current and/or expected traffic, etc. Once known, an optimal method of traversing the data may need to be calculated.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router, can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc., that can alter sustainability optimization. The elements depicted in FIG. 1 may also be interchangeable with other elements of FIGS. 2-9 as required to realize a particularly desired embodiment.

Figure 2:
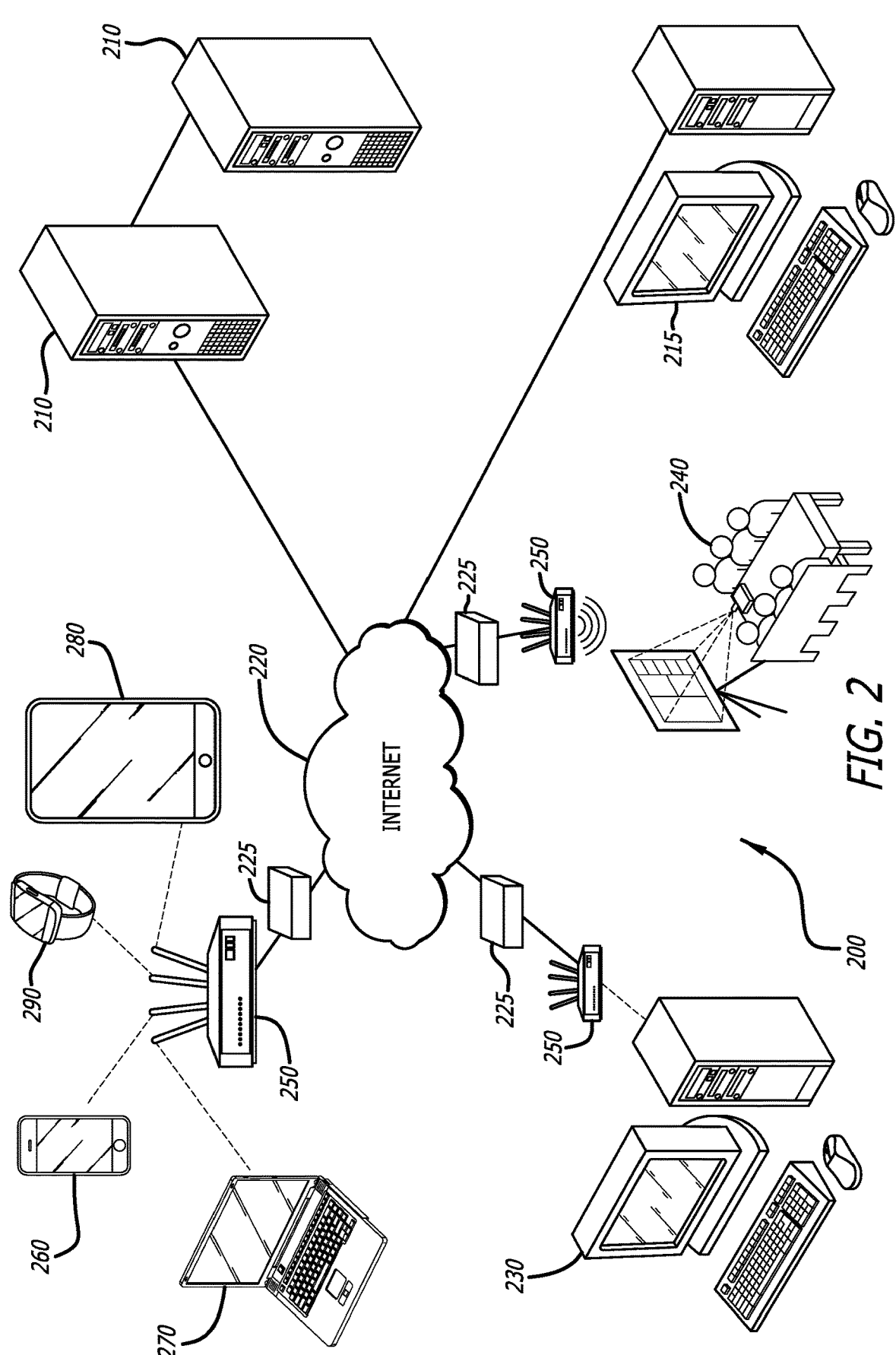
FIG. 2 is a conceptual illustration of a network in accordance with various embodiments of the disclosure.

Referring to FIG. 2, a conceptual illustration of a network 200 in accordance with various embodiments of the disclosure is shown. Network 200 may comprise a plurality of servers 210 coupled to an administrator console 215 via the Internet 220. The servers may contain various sorts of data that can be accessed from the administrator console 215 and other devices coupled to the Internet 220. In many embodiments, the servers 210 and administrator console 215 may be hard-wired to the Internet 220 using a technology such as Ethernet. The speed of various Ethernet connections may vary depending on the hardware available at each end of the connection. In a number of embodiments, optical or wireless or other types of connections may be used.

Client computer 230 may be coupled with the Internet 220 through Ethernet switch 225. The AP may comprise a network interface controller to communicate with the Ethernet switch. AP 250 may typically comprise one or more device transceivers to support one or more different wireless technologies like, but not limited to, Wi-Fi communicating at 2.4 Gigahertz (GHz), 5.0 GHz, and/or 6.0 GHz, Bluetooth, cellular technologies like 3G, 4G, and 5G, etc., to support wireless network access. Client computer 230 may have an antenna (not shown in the figure) that is coupled with a transceiver. This transceiver may wirelessly couple with antennas and transceivers in wireless AP 250.

Wireless AP 250 may be coupled with an Ethernet cable to Ethernet switch 225. The Ethernet connection speed may be negotiated between AP 250 and Ethernet switch 225. In a variety of embodiments, the speed may be determined by the throughput of the connection with client computer 230 and any other wireless clients coupled to AP 250. Transceivers in AP 250 may be turned completely on or off or put into a state where they may operate with reduced power and reduced bandwidth. Sometimes transceiver/antenna pairs are also referred to as radios. The bandwidth of these radios may be divided into portions called chains, and only some of the chains may be operated at various times in a variety of embodiments. Details of these operations will be discussed below.

Also connected to the Internet 220 is conference room 240 (symbolically represented by people seated around a table). During a meeting in conference room 240, many different clients may be present. Each attendee may have a cellphone, a tablet, a laptop, or other computing device. There may be a projector displaying the desktop of a client in conference room 240 or from some other client from outside conference room 240 (not shown). There may be a VoIP (Voice over Internet Protocol) speaker phone (not shown) carrying a conference call allowing all attendees inside and outside conference room 240 to address the other attendees. All of these connections may be made with a wireless AP 250 coupled with a cable to an Ethernet switch 225 coupled to the Internet 220.

In another location, there may be a plurality of client devices coupled to Internet 220 via another AP 250 and another Ethernet switch 225. Cellphone 260, laptop 270, tablet 280, and smartwatch 290 may all be wirelessly connected to different radios using different protocols in the AP 250. In additional embodiments, the AP 250 and Ethernet switch 225 are connected with cables to the Internet 220.

Although a specific embodiment for a network 200 is described above with respect to FIG. 2, any of a variety of systems and/or processes may be utilized in accordance with embodiments of the disclosure. For example, the network could be broken into a plurality of partitions, wherein each partition could have specific needs, service level agreements, etc., that can alter sustainability optimization. The elements depicted in FIG. 2 may also be interchangeable with other elements of FIGS. 1 and 3-9 as required to realize a particularly desired embodiment.

Figure 3:
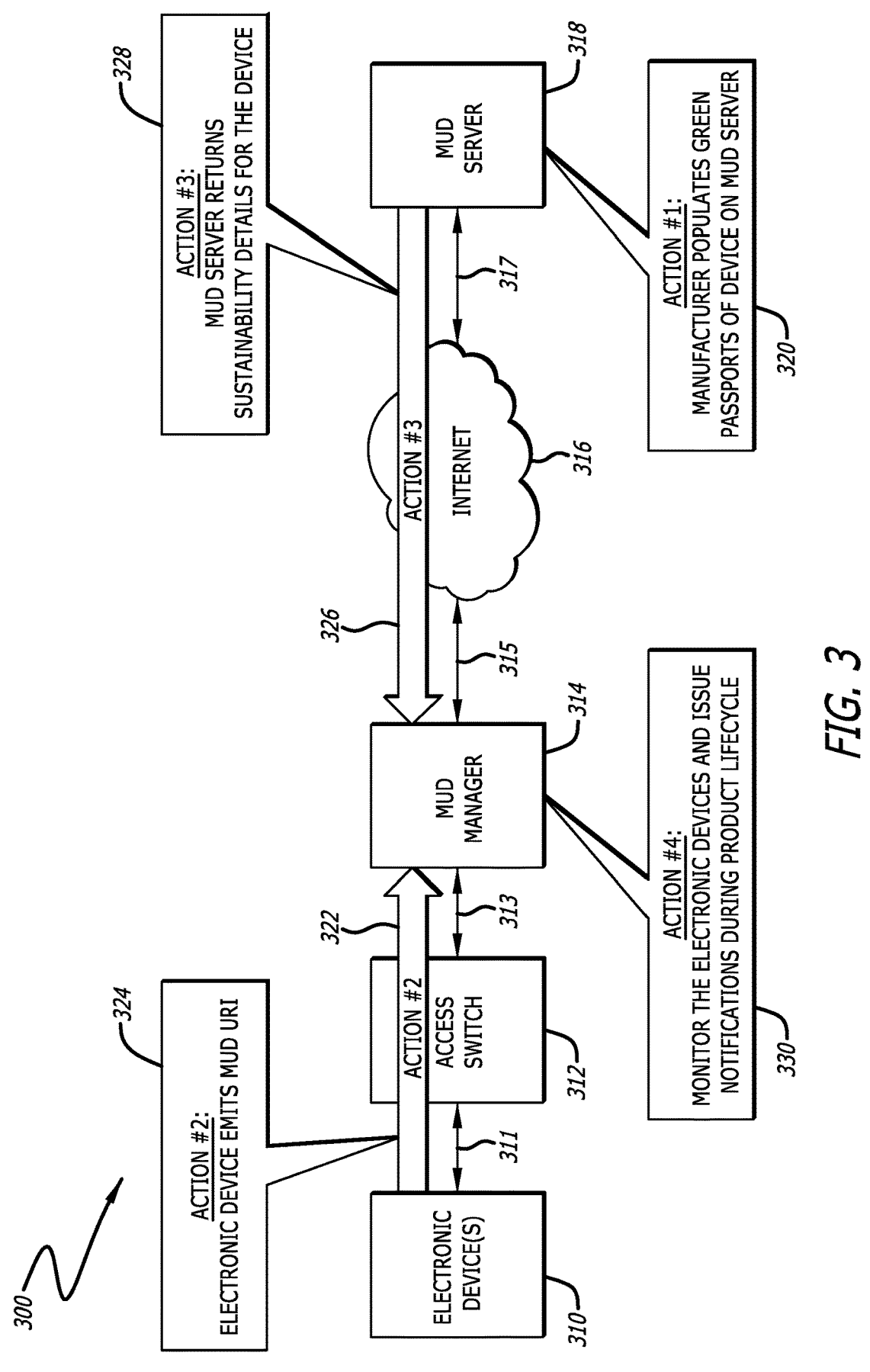
FIG. 3 is a network block diagram in accordance with various embodiments of the disclosure.

Referring to FIG. 3, a network block diagram in accordance with various embodiments of the disclosure is shown. Network 300 may comprise one or more electronic devices 310, an access switch 312, a Manufacturer Usage Description (MUD) manager 314 (a networking device), and a MUD server 318. These devices may be coupled together with links 311, 313, 315, and 317 and the Internet 316.

MUD is a security framework and standard that aims to enhance the security of Internet of Things (IoT) devices. It may allow IoT device manufacturers to describe the intended behavior and network communication requirements of their devices. The MUD specification may define a format for manufacturers to declare the network behavior of their devices using a simple text file. This declaration may include information about the device's expected network communication patterns, such as the protocols, ports, and hosts it should interact with. It may also specify any additional security requirements or constraints.

A device with MUD support may be connected to a network, and the network infrastructure may automatically analyze the MUD file associated with the device. Based on the MUD information, network administrators can enforce appropriate security policies and restrictions to prevent malicious activities. The MUD framework may help mitigate security risks associated with IoT devices by allowing network administrators to control and monitor the network traffic generated by these devices. By understanding the expected behavior of devices, administrators can identify and block unauthorized or potentially harmful network traffic, reducing the attack surface and enhancing overall network security.

Action #1 (320) may comprise the manufacturer(s) of the device or devices 310 populating the green passports of the devices on a MUD server 318. The manufacturer of the device may be responsible for providing and maintaining the green passport data for their devices in a central repository. The manufacturer may post green passports for its manufactured devices. Each device will emit a Uniform Resource Indicator (URI) that will redirect to the server hosting the green passport database. The manufacturer can also provide associated green passports for the packaging materials used to ship the devices. Alternatively, a subsection of the device green passport could be used for the packaging.

A URI (Uniform Resource Identifier) may be a string of characters that identifies a resource on the Internet. It may be a standardized way to represent the address or location of a resource, such as a web page, a file, an image, or any other piece of content that can be accessed over a network. A URI may consist of two main parts: the scheme and the path.

The scheme may indicate the protocol or application used to access the resource. It is typically represented by a sequence of letters followed by a colon (e.g., "http:", "https:", "ftp:", "mailto:"). The scheme defines how the resource will be accessed and interpreted. The path specifies the specific location or name of the resource within the scheme's context. It can include directories, filenames, query parameters, or any other relevant information required to identify the resource.

For example, consider the URI "https://www.example-.com/index.html". Here, the scheme may be "https" (indicating the Hyper-Text Transfer Protocol Secure), and the path may be "/index.html" (representing the specific file "index.html" located on the web server at "www.example-.com"). URIs may provide a standardized way to reference resources across different protocols and applications on the Internet. They may be widely used in web browsing, file transfer, email, and various other network-based systems.

The end user can leverage the green passport at a few different times during the device's lifecycle: (i) at the time of the purchase to choose greener products with a high reusability/recyclability quotient; at the time of first installation, to dispose of the packaging materials in an eco-friendly manner; at the time of replacement (due to failure or end of life) to follow appropriate guidelines provided by the manufacturer and make environmentally aware choices to drive the circular green economy.

The green passports may be written in JavaScript Object Notation (JSON). JSON is a data interchange format that is widely used for transmitting structured data between a server and a client over a network. It is a text-based format that is easy for humans to read and write, and it is also easy for machines to parse and generate. JSON is derived from JavaScript but is language-independent, meaning it can be used with any programming language.

Below is an exemplary JSON green passport:

```
{
"green-passport:green_passport": {
"version": N,
"green-url": "https://e-device.example.com/dnsname",
"last-update": "YYYY-MM-DD HH:MM:SS:MSEC",
"systeminfo": "Description of the device",
"mfg-name": "Example, Inc.",
"documentation": "https://e-device.example.com/doc/dnsname",
"model-name": "dnsname",
"composition": "metal, plastic, ...",
"reusable_components": "gold, metal, ...",
"recyclable_components": "paper, plastic, ...",
"risky_materials": "mercury, ..."
}
}
```

Persons skilled in the art will realize that additional information in the exemplary JSON green passport could include the composition of the device and the sustainability information of the shipping materials.

Action #2 (322, 324) may comprise the device(s) 310 emitting a MUD URI. Each device 310 may emit a URI that redirects the user to the publicly accessible green passport server (MUD server 318) where the green passport for the device is hosted. MUD manager 314 receives the URI and queries the MUD server 318.

Action #3 (326, 328) may comprise the MUD server 318 sending a response to the on-premises MUD manager 314 (e.g., MUD manager 314 may download the green passport file). MUD manager 314 may translate the response into actions and instructions to enable eco-friendly disposal of the device. This on-premises green passport manager can be a standalone application or integrated into an inventory/asset management system. Action #4 (330) may comprise the MUD manager 314 monitoring the devices 310 and issuing notifications during the product lifecycle and at end-of-life (due to failure or replacement).

Although a specific embodiment for a network 300 is described above with respect to FIG. 3, any of a variety of systems and/or processes may be utilized in accordance with embodiments of the disclosure. For example, the network could comprise a green passport server to offload the monitoring function from MUD manager 314. The elements depicted in FIG. 3 may also be interchangeable with other elements of FIGS. 1-2 and 4-9 as required to realize a particularly desired embodiment.

Figure 4:
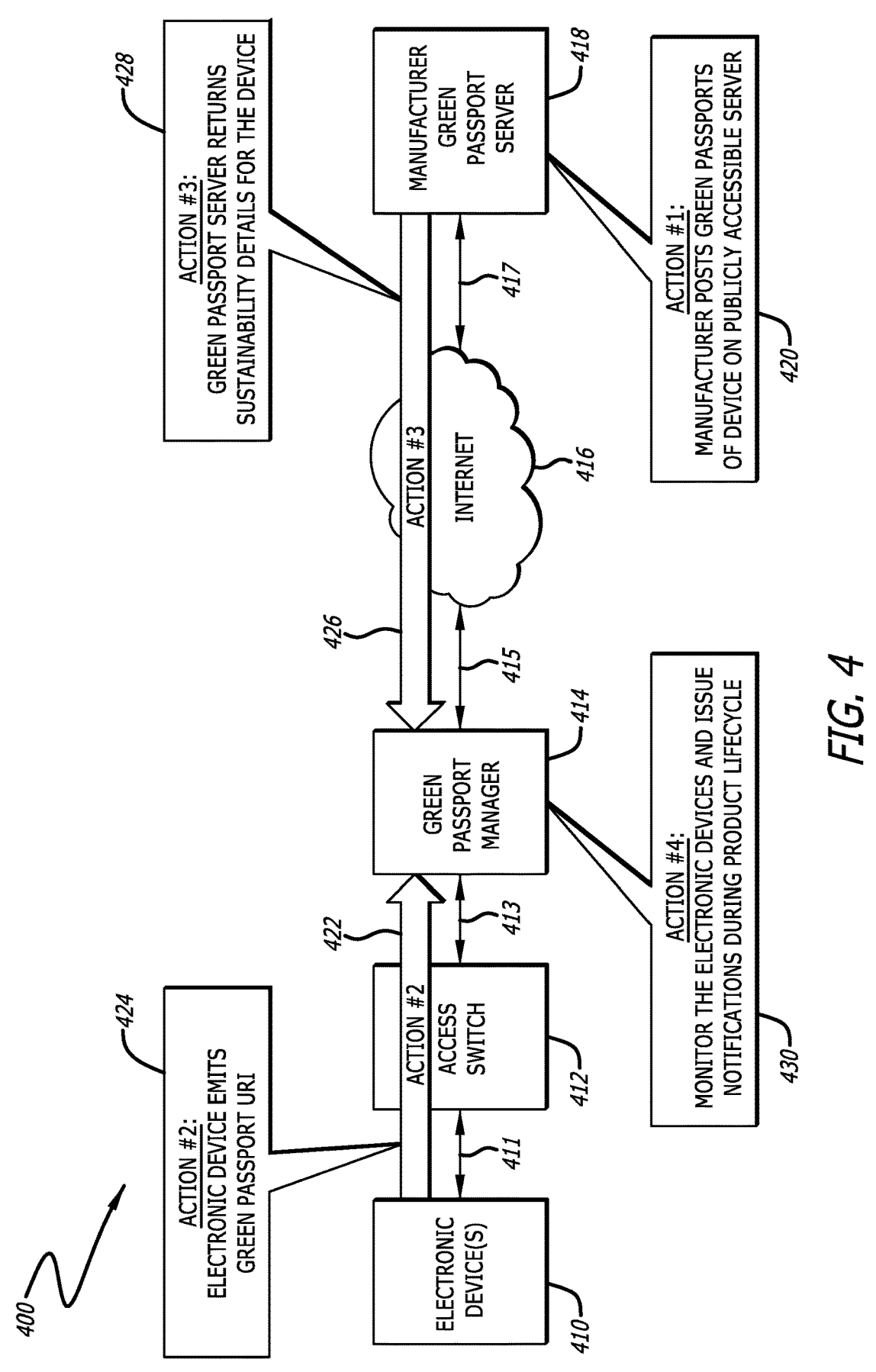
FIG. 4 is a network block diagram in accordance with various embodiments of the disclosure.

Referring to FIG. 4, a network block diagram in accordance with various embodiments of the disclosure is shown. Network 400 may comprise one or more electronic devices 410, an access switch 412, a green passport manager 414 (a networking device), and a manufacturer green passport server 418. These devices may be coupled together with links 411, 413, 415, and 417 and the Internet 416.

Action #1 (420) may comprise the manufacturer of the device or devices 410 populating the green passport(s) of the device(s) on the manufacturer's green passport server 418. The manufacturer of the device may be responsible for providing and maintaining the green passport data for their devices in a central repository. The manufacturer may post green passports for its manufactured devices. Each device will emit a Uniform Resource Indicator (URI) that will redirect to the server hosting its green passport database. The manufacturer can also provide associated green passports for the packaging materials used to ship the devices. Alternatively, a subsection of the device green passport could be used for the packaging.

The end user can leverage the green passport at a few different times during the device's lifecycle: (i) at the time of the purchase to choose greener products with a high reusability/recyclability quotient; (ii) at the time of first installation, to dispose of the packaging materials in an eco-friendly manner; and (iii) at the time of replacement (due to failure or end of life) to follow appropriate guidelines provided by the manufacturer and make environmentally aware choices to drive the circular green economy.

Action #2 (422, 424) may comprise the device 410 emitting a green passport URI. Each device 410 may emit a URI that redirects the user to the publicly accessible green passport server 418 where the green passport for the device is hosted. Green passport manager 414 receives the URI and queries the green passport server 418.

Action #3 (426, 428) may comprise the manufacturer green passport server 418 sending a green passport for the device 410 in response to the on-premises green passport manager 414. The green passport manager 414 may translate the response into actions and instructions to enable eco-friendly disposal of the device. This on-premises green passport manager can be a standalone application or integrated into an inventory/asset management system. Action #4 (430) may comprise the green passport manager 414 monitoring the devices 410 and issuing notifications during the product lifecycle and at end-of-life.

Persons skilled in the art will realize that green passports may be implemented in a variety of ways. They may leverage the MUD framework, as shown in the exemplary embodiment of FIG. 3, or they may be implemented in a manner completely separate from the MUD framework, as illustrated in the exemplary embodiment of FIG. 4.

Although a specific embodiment for a network 400 is described above with respect to FIG. 4, any of a variety of systems and/or processes may be utilized in accordance with embodiments of the disclosure. For example, the network could be broken into a plurality of partitions, wherein each partition could have its own green passport manager for the local electronic devices. The elements depicted in FIG. 4 may also be interchangeable with other elements of FIGS. 1-3 and 5-9 as required to realize a particularly desired embodiment.

Figure 5:
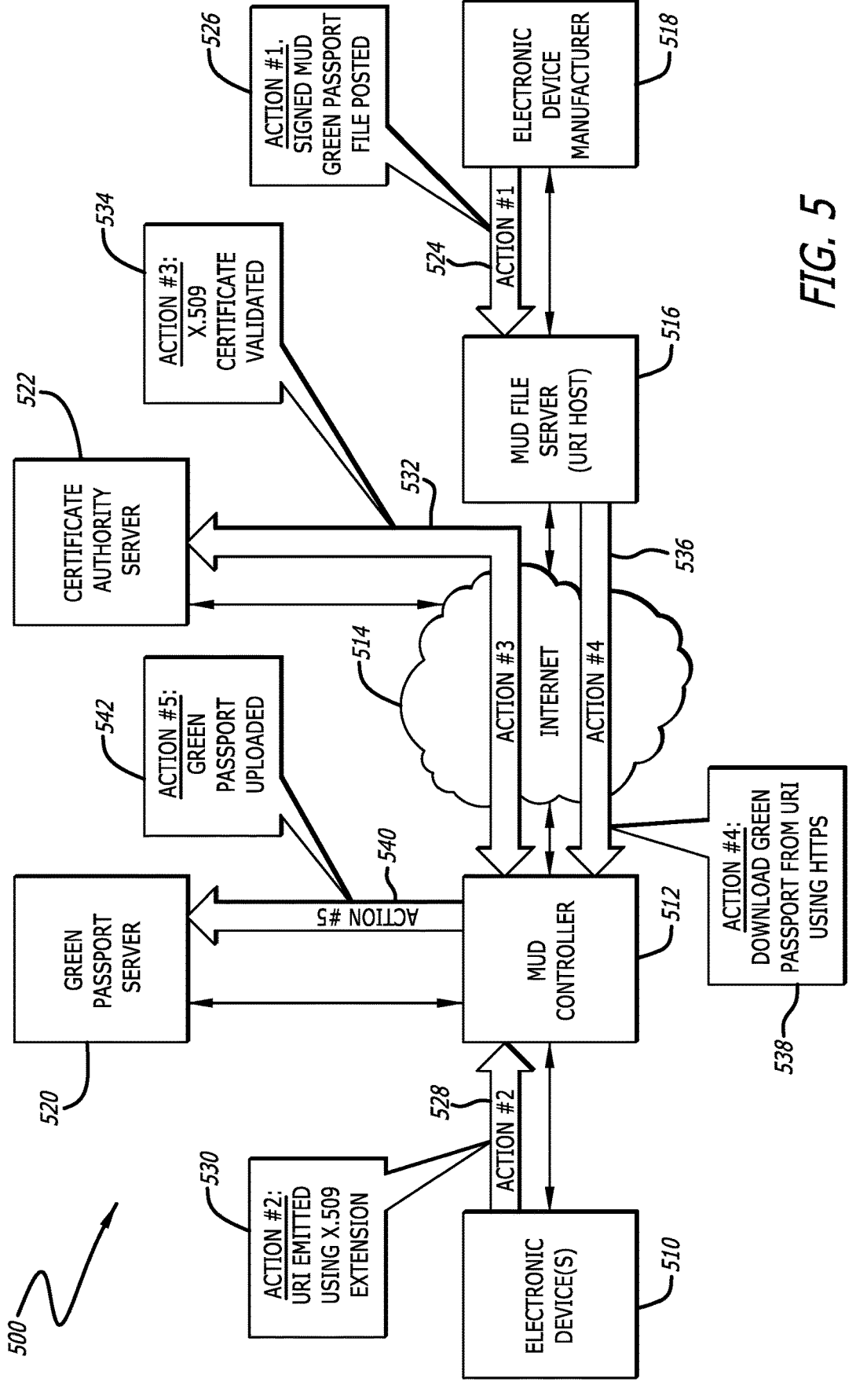
FIG. 5 is a network block diagram in accordance with various embodiments of the disclosure.

Referring to FIG. 5, a network block diagram in accordance with various embodiments of the disclosure is shown. Network 500 may comprise one or more electronic devices 510, a MUD controller 512 (a networking device), a publicly facing MUD file server (URI host) 516, a private electronic device manufacturer's server 518, green passport server 520, and a Certificate Authority (CA) server 522. These elements may be coupled together with various links (shown as thin arrows but not numbered to avoid cluttering the figure) and/or the Internet 514.

A MUD controller refers to a component or system that manages and controls the behavior of devices in accordance with Manufacturer Usage Descriptions (MUD). MUD is a security framework for Internet of Things (IoT) devices that specifies the expected network behavior and communication patterns of these devices. A MUD controller performs the following functions: MUD profile enforcement, access control, policy updates, security monitoring, and integration with network infrastructure, etc. The MUD controller plays a vital role in ensuring that IoT devices operate within the specified network behavior and comply with security policies. Enforcing MUD profiles and controlling network communication helps mitigate security risks associated with IoT devices and protects the overall network infrastructure.

In this exemplary embodiment, the authentication and encryption capabilities of the MUD framework may be used at each step to prioritize security and data integrity. For example, an electronic device may falsely claim to be a legitimate device. It may also forge routing information because a MUD URI from an electronic device may be spoofed. This can cause a MUD controller to be pointed to a rogue entity and thus compromising the network or the green passport. Data encryption may be used to prevent snooping and man-in-the-middle attacks. Also, the integrity of the green passport file on the MUD file server needs to be validated.

Action #1 (524, 526) may comprise the manufacturer of the device or servers 518 populating the green passports of the devices on the manufacturer's MUD server 516. The manufacturer of the device may be responsible for providing and maintaining the green passport data for their devices in a central repository. The green passport files may be signed by the manufacturer to ensure the contents of the files are not altered.

Each device will emit a Uniform Resource Indicator (URI) that will redirect to the server hosting the green passport database (e.g., MUD file server 516). The manufacturer can also provide associated green passports for the packaging materials used to ship the devices. Alternatively, a subsection of the device green passport could be used for the packaging.

Action #2 (528, 530) may comprise device 510 emitting a green passport URI. Each device 510 may emit a URI that redirects the user to the publicly accessible green passport server (e.g., MUD file server 516) where the green passports for the devices are hosted. The URI may be issued with a certificate utilizing MUD extension X.509.

An X.509 extension refers to additional fields or attributes that can be included in an X.509 digital certificate. X.509 is a widely used standard for defining the format of public key certificates, which are used for various security protocols such as SSL/TLS, IPsec, S/MIME, etc. X.509 extensions may provide a way to extend the basic information in a certificate beyond the standard fields like the subject, issuer, validity period, and public key. They may allow for the inclusion of additional data that can serve various purposes, such as specifying certificate usage constraints, key usage purposes, or additional attributes related to the subject of the certificate. Some common X.509 extensions may, for example, include:

Key Usage Extension: This extension specifies the cryptographic operations that the certificate's public key can be used for, such as encryption, digital signatures, or key agreement. Extended Key Usage Extension: This extension further refines the key usage by specifying the specific purposes or applications for which the certificate can be used. For example, it may indicate that the certificate is intended for server authentication, client authentication, or code signing. Authority Key Identifier Extension: This extension provides a way to identify the public key associated with the certificate's issuer, facilitating the chaining of certificates in a PKI (Public Key Infrastructure). CRL Distribution Points Extension: This extension specifies the locations where the Certificate Revocation Lists (CRLs) for the certificate issuer can be found. CRLs are used to check if a certificate has been revoked.

These are just a few examples of X.509 extensions. Many more are defined by the X.509 standard. The inclusion of extensions in a certificate can allow for the customization and fine-tuning of certificate properties to meet specific security requirements or use cases.

In Action #3 (532, 534), the MUD controller 512 may send the emitted URI from the electronic device 510 to an independent Certificate Authority (CA) server 522. If legitimate, the CA server 522 may return a decrypted and validated URI X.509 certificate to MUD controller 512. This may allow MUD controller 512 to proceed to the next action of obtaining a green passport for the electronic device.

In Action #4 (536, 538), MUD controller 512 may download the green passport from the MUD file server 516. The validated X.509 certificate may ensure that MUD controller 512 goes to the correct location to get the legitimate green passport for the electronic device 510. The manufacturer's signature on the green passport may ensure that no tampering with the green passport has occurred.

In Action #5 (540, 542), MUD controller 512 may upload the green passport to green passport server 520. Green passport server 520 may then monitor the electronic device 510 and provide notifications during the lifetime(s) of the device 510.

Although a specific embodiment for a network 500 is described above with respect to FIG. 5, any of a variety of systems and/or processes may be utilized in accordance with embodiments of the disclosure. For example, the network could be partitioned, with each portion having its own green passport server for its local devices. The elements depicted in FIG. 5 may also be interchangeable with other elements of FIGS. 1-4 and 6-9 as required to realize a particularly desired embodiment.

Referring to FIG. 6, a flowchart depicting a process 600 for tracking an electronic device in accordance with various embodiments of the disclosure is shown. The manufacturer of an electronic device may post sustainability data on a public-facing Manufacturer Usage Description (MUD) server (block 610). MUD is a security framework and standard that aims to enhance the security of Internet of Things (IoT) devices. It may allow IoT device manufacturers to describe the intended behavior and network communication requirements of their devices.

The manufacturer of the device may be responsible for providing and maintaining the sustainability data for their devices in a central repository. Each electronic device may emit a Uniform Resource Indicator (URI) that may redirect to the server hosting the manufacturer's sustainability data database. The manufacturer may also provide associated sustainability data for the packaging materials used to ship the devices, either in the device sustainability data or as separate sustainability data.

The electronic device may emit a URI pointing towards the sustainability data on the publicly accessible MUD server (block 620). Each electronic device may emit a URI that redirects the user to the publicly accessible MUD server where the green passport for the device is hosted. The URI may be used to direct a MUD manager to the publicly accessible MUD server where the sustainability data for the device is hosted.

The MUD manager may receive the MUD URI (block 630). The MUD manager may use the URI to query the MUD server for the sustainability data. In return, the MUD manager may download the sustainability data from the MUD server (block 640). The MUD manager may translate the response into actions and instructions to enable eco-friendly disposal of the device. This on-premises green passport MUD manager can be a standalone application or integrated into an inventory/asset management system.

The MUD manager may monitor the electronic device and issue notifications during the product lifecycle (block 650). The MUD manager may issue sustainable disposal information at the electronic device's end-of-life (block 660). The MUD manager may translate the sustainability data into actions and instructions to enable eco-friendly disposal of the device.

Although a specific embodiment for process 600 is described above with respect to FIG. 6, any of a variety of systems and/or processes may be utilized in accordance with embodiments of the disclosure. For example, the MUD manager could offload green passport management to a separate green passport server, that function could be retained by the MUD controller. The elements depicted in FIG. 6 may also be interchangeable with other elements of FIGS. 1-5 and 7-9 as required to realize a particularly desired embodiment.

Referring to FIG. 7, a flowchart depicting a process 700 for tracking an electronic device in accordance with various embodiments of the disclosure is shown. The manufacturer of an electronic device may post a green passport for one or more devices on a publicly accessible server (block 710), which may or may not be a MUD server. The manufacturer of the device may be responsible for providing and maintaining the green passports for their devices in a central repository. Each electronic device may emit a Uniform Resource Indicator (URI) that may redirect to the server hosting the manufacturer's green passport database. The manufacturer can also provide associated sustainability data for the packaging materials used to ship the devices, either in the device green passport or as a separate green passport.

The electronic device may emit a URI pointing towards the sustainability data on the publicly accessible green passport server (block 720). Each electronic device may emit a URI that redirects the user to the publicly accessible green passport server where the green passport for the device is hosted. The URI may be used to direct a green passport manager to the publicly accessible server where the sustainability data for the device is hosted.

The green passport manager may receive the green passport URI (block 730). The green passport manager may use the URI to query the green passport server for the sustainability data. In return, the green passport manager may download the sustainability data from the green passport server (block 740). The green passport manager may translate the response into actions and instructions to enable eco-friendly disposal of the device. This on-premises green passport manager can be a standalone application or integrated into an inventory/asset management system.

The green passport manager may monitor an electronic device and issue notifications during its product lifecycle (block 750). The green passport manager may issue sustainable disposal information at the electronic device's end-of-life (block 760). In particular, the green passport manager may translate the sustainability data into actions and instructions to enable eco-friendly disposal of the device.

Although a specific embodiment for process 700 is described above with respect to FIG. 7, any of a variety of systems and/or processes may be utilized in accordance with embodiments of the disclosure. For example, the network could encompass hundreds or thousands of electronic devices and multiple green passport servers, each serving a local group of electronic devices. The elements depicted in FIG. 7 may also be interchangeable with other elements of FIGS. 1-6 and 8-9 as required to realize a particularly desired embodiment.

Referring to FIG. 8, a flowchart depicting a process 800 for tracking an electronic device in accordance with various embodiments of the disclosure is shown. The manufacturer of an electronic device may create a signed green passport (block 810). The file containing the signed green passport has an electronic signature that, when queried, indicates if there have been any changes to the file. This prevents malicious actors from supplying a bogus green passport to the green passport server, as the file can be verified as legitimate (or not).

The signed green passport can be posted by the manufacturer on a MUD file server (block 820). As discussed above, MUD is a security framework and standard that aims to enhance the security of Internet of Things (IoT) devices. It may allow IoT device manufacturers to describe the intended behavior and network communication requirements of their devices.

The manufacturer of the electronic device may be responsible for providing and maintaining the sustainability data for their devices in a central repository. An electronic device may emit a Uniform Resource Indicator (URI) that may redirect to the server hosting the manufacturer's signed green passport database. The manufacturer can also provide associated sustainability data for the packaging materials used to ship the devices, either in the signed green passport or as a separate green passport.

The electronic device may emit a URI pointing towards the signed green passport file on the publicly accessible signed green passport MUD server using a Certificate Authority (CA) certificate (block 830). This may be done with a MUD X.509 extension. The URI may be received by the MUD controller (block 840) and then sent to a CA server for decryption and validation (block 850). The MUD controller receives the validated and decrypted CA certificate (block 860) and queries the publicly accessible green passport MUD server where the signed green passport for the device is hosted.

The MUD controller may use the verified URI to query the MUD server for the signed green passport data. In return, the MUD controller may use Hyper-Text Transfer Protocol Secure (https) to download the signed green passport file from the MUD server (block 870). The MUD controller may upload the signed green passport file to a green passport server (block 880). The green passport server may translate the response into actions and instructions to enable eco-friendly disposal of the device. This on-premises green passport server can be a standalone application or integrated into an inventory/asset management system.

The green passport server may monitor the electronic device and issue notifications during the product lifecycle (block 890). The green passport server may issue sustainable disposal information at the electronic device's end-of-life (block 895). The green passport server may translate the sustainability data into actions and instructions to enable eco-friendly disposal of the device.

Although a specific embodiment for process 800 is described above with respect to FIG. 8, any of a variety of systems and/or processes may be utilized in accordance with embodiments of the disclosure. For example, the network could be partitioned, with each partition having its own green passport server for its local devices. The elements depicted in FIG. 8 may also be interchangeable with other elements of FIGS. 1-7 and 9 as required to realize a particularly desired embodiment.

Figure 9:
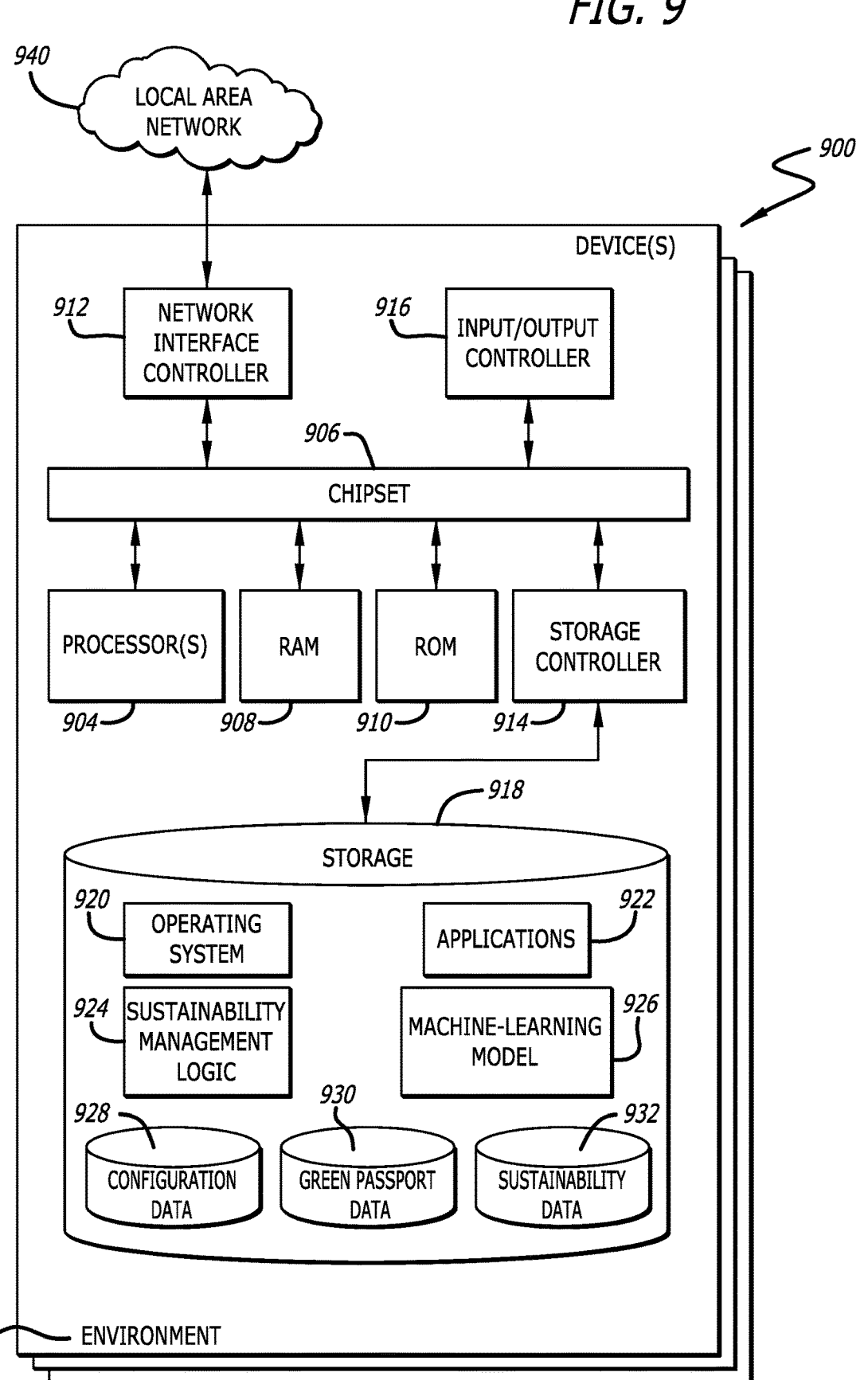
FIG. 9 is a conceptual block diagram of a device suitable for use in tracking electronic devices in accordance with various embodiments of the disclosure.

Referring to FIG. 9, a conceptual block diagram for one or more devices 900 capable of executing components and logic for implementing the functionality and embodiments described above is shown. The embodiment of the conceptual block diagram depicted in FIG. 9 can illustrate a conventional server computer, workstation, desktop computer, laptop, tablet, network appliance, e-reader, smartphone, or other computing device, and can be utilized to execute any of the application and/or logic components presented herein. The device 900 may, in some examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs"), can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, applications 922, and data 928, 930, and 932, which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of the physical state can depend on various factors. Examples of such factors can include, but are not limited to, the technology used to implement the physical storage units, whether the storage 918 is characterized as primary or secondary storage, and the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In various embodiments, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as applications 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform the functions described herein. The virtualization layer may generally support a virtual resource that performs at least a portion of the techniques described herein.

In many embodiments, the device 900 can include a sustainability management logic 924. Sustainability Management Logic (SML) 924 may be where the overall green passport management takes place. SML 924 may be configured to receive URIs from electronic devices and look for Green Passports on a manufacturer's green passport server. If a URI comes with a certificate, SML 924 may send the URI to a Certificate Authority server to decrypt and validate the certificate. If the certificate is valid, SML 924 downloads the green passport to green passport data 930. SML 924 may also send the green passport to a green passport server for further action.

In further various embodiments, SML 924 may perform the function of a green passport server. This may involve monitoring the electronic device and providing notifications during its lifecycle according to the GP stored in the green passport data 930. SML may also verify the manufacturer's signature of the GP information received.

In a number of embodiments, the storage 918 can include configuration data 928. This can include data needed by SML 924 to determine where the green passport ultimately resides during the lifetime of the electronic device. In various embodiments, the storage 918 can include green passport data 930. This is where the green passport is kept during the lifecycle of the electronic device. In still more embodiments, the storage 918 can include sustainability data 932. This may include some of the green passport data for providing notifications during the lifetime of the electronic device.

Finally, in many more embodiments, data may be processed into a format usable by a machine-learning model 926 (e.g., feature vectors) and/or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure or for solutions to such problems to be encompassed by the present claims. Furthermore, no element, component, or method step in the present disclosure is intended to be dedicated to the public, regardless of whether the element, component, or method step is explicitly recited in the claims. Various changes and modifications in form, material, work-piece, and fabrication material detail can be made without departing from the spirit and scope of the present disclosure, as set forth in the appended claims, as might be apparent to those of ordinary skill in the art, are also encompassed by the present disclosure.

What is claimed is:

1. A networking device, comprising:
a processor;
a network interface configured to be coupled to a network; and
a memory communicatively coupled to the processor, wherein the memory comprises a sustainability management logic circuit that is configured to:
receive a Uniform Resource Identifier (URI) from an electronic device; and
download a green passport data file corresponding to the electronic device from a file server wherein the green passport comprises end-of-life disposal information for the electronic device.

2. The networking device of claim 1, wherein:
the URI is encrypted;

the sustainability management logic circuit is configured to send the encrypted URI to a Certificate Authority (CA) server for decryption and validation; and the sustainability management logic circuit is configured to receive the decrypted and validated URI from the CA server.

3. The networking device of claim 2, wherein:

the sustainability management logic circuit is configured to monitor the electronic device; and the sustainability management logic circuit is configured to issue notifications during a lifecycle of the electronic device based on the green passport.

4. The networking device of claim 3, wherein the sustainability management logic circuit is configured to upload the green passport corresponding to the decrypted and validated URI to a green passport server.

5. The networking device of claim 3, wherein:

the networking device is a Manufacturer Usage Description (MUD) controller; and the file server is a MUD server.

6. The networking device of claim 5, wherein the URI received from the electronic device is encrypted using a certificate authority certificate.

7. The networking device of claim 6, wherein the URI received from the electronic device is encrypted using an X.509 extension.

8. The networking device of claim 7, wherein the green passport posted on the MUD server is signed and posted by a manufacturer of the electronic device.

9. The networking device of claim 8, wherein the networking device downloads the green passport from the file server using Hyper-Text Transfer Protocol Secure (HTTPS).

10. The networking device of claim 9, wherein the green passport corresponding to the decrypted and validated URI is uploaded to a green passport server.

11. The networking device of claim 1, wherein the green passport comprises sustainability data for the electronic device.

12. A method of operating a Green Passport (GP) manager, comprising:

monitoring a GP server for green passports;

receiving a Uniform Resource Identifier (URI) from an electronic device;

receiving a green passport data file for the electronic device from the GP server wherein the green passport data file comprises end-of-life disposal information for the electronic device;

monitoring the electronic device; and issuing notifications during a lifecycle of the electronic device.

13. The method of claim 12, wherein the green passport comprises sustainability data for the electronic device.

14. The method of claim 13, wherein the green passport is stored in JSON format.

15. The method of claim 13, wherein a manufacturer of the electronic device populates the green passport of the electronic device on the GP server.

16. A non-transitory computer-readable storage media configured to store instructions and data to be executed by one or more processors, where the instructions, when executed, cause a Manufacturer Usage Description (MUD) manager to perform steps as follows, comprising:

monitoring a MUD server for sustainability data;

receiving a MUD Uniform Resource Identifier (URI) from an electronic device;

downloading green passport data for the electronic device from the MUD server in response to the URI wherein the green passport data comprises end-of-life disposal information for the electronic device;

monitoring the electronic device; and issuing notifications during a lifecycle of the electronic device.

17. The non-transitory computer-readable storage media of claim 16, wherein the green passport data is stored in JSON format.

* * * * *